United States Patent [19]

Freimuth et al.

[11] 4,167,844
[45] Sep. 18, 1979

[54] AUTOMATIC TWINE WRAPPING APPARATUS

[75] Inventors: John H. Freimuth, New Holland; Willis R. Campbell, Ephrata, both of Pa.

[73] Assignee: Sperry Rand Corporation, New Holland, Pa.

[21] Appl. No.: 894,457

[22] Filed: Apr. 7, 1978

[51] Int. Cl.² .................... B65B 13/18; A01D 39/00
[52] U.S. Cl. ........................................... 56/343; 100/5
[58] Field of Search ............... 100/5, 13, 88, 4, 27; 56/341, 342, 343

[56] References Cited

U.S. PATENT DOCUMENTS

| | | | |
|---|---|---|---|
| 2,336,491 | 12/1943 | Luebben | 100/88 X |
| 2,468,641 | 4/1949 | Scranton | 100/5 X |
| 2,581,542 | 1/1952 | Kolling | 100/5 X |
| 2,627,223 | 2/1953 | Berge | 100/13 |
| 2,630,751 | 3/1953 | Cranston | 100/27 |
| 2,868,113 | 1/1959 | Harrer | 100/5 |
| 3,004,377 | 10/1961 | Harrer | 56/341 |
| 3,064,556 | 11/1962 | Luebben | 100/5 |
| 3,129,654 | 4/1964 | Locker | 100/4 |
| 3,913,473 | 10/1975 | Meiers | 100/88 X |
| 4,009,559 | 3/1977 | Mast | 100/88 X |

*Primary Examiner*—Billy J. Wilhite
*Attorney, Agent, or Firm*—R. D'Alessandro; F. A. Seemar; J. B. Mitchell

[57] ABSTRACT

In a crop roll forming machine having cooperating upper and lower bale forming means there is provided an improved automatic twine wrapping mechanism for binding a completed crop roll with binding material. The automatic twine wrapping mechanism is triggered by one of either two trip devices to automatically effect the serial steps of the twine wrapping cycle.

11 Claims, 12 Drawing Figures

AUTOMATIC TWINE WRAPPING APPARATUS

BACKGROUND OF THE INVENTION

This invention relates to a machine for forming large cylindrical bales of crop material, commonly called round bales, and more particularly to apparatus for wrapping the completed bale with a binding material in a coiled fashion between the bale's opposing ends. The apparatus, once it is triggered, functions automatically to wrap the binding material about the bale of crop material as the bale is rotated about a horizontal axis prior to the bale's being discharged from the bale forming machine. The apparatus will also effect the automatic cutting of the binding material at the end of the wrapping cycle.

Historically, it has been the custom to harvest forage crops by mowing the crops, letting them dry in the field, forming the dried crop material into windrows and passing a hay-baling machine over and along these windrows to form the crop material into rectangular bales. Recent practice has shown that the formation of crop materials into large compact rolls, rather than rectangular bales as formerly done, permitted the crop material to be deposited in roll form and left in fields for extended periods of time since the rolled material tends to provide a self-shedding protective covering from inclement weather. The ability to leave these rolled bales in fields thus obviated the additional steps of gathering the rectangular bales and transporting them to a storage area protected from the elements.

Several methods for forming compact rolls of crop material have evolved through the years. The original use of compact rolls of crop material can be traced back 30 or 40 years to the small cylindrical bale of hay or other fibrous material produced by the type of machine illustrated in U.S. Pat. No. 2,336,491, dated Dec. 14, 1943. This method produced compact rolls of crop material, but suffered from the principal disadvantage of having those rolls being of such small diameter that the spoilage due to weathering around the periphery of the roll was excessive in comparison to the overall diameter of the roll when stored in the field. In another method, a machine rolled a swath or windrow of crop material along the ground until a roll of desired size was obtained. An example of a machine utilizing this principle is shown in prior U.S. Pat. No. 3,110,145 dated Nov. 12, 1963. The principal difficulty encountered in using this technique resulted from the fact that a certain amount of the crop material remained upon the ground without being included in the crop roll and dirt, clods of earth, stones and the like were picked up by the roll and included therein. These characteristics proved to be undesirable under many circumstances, although the formed roll of crop material was large enough to make it economically feasible to store outside in a field with no cover without encountering excessive weathering losses. A later and more successful method of forming crop rolls utilized machines which picked up a swath or windrow of crop material from the field and deposited it onto a lower conveyor. The conveyor transported the material to a roll forming region where an upper apron or flight of belts, usually positioned above and adjacent the conveyor, moved in a suitable direction to rotate the crop material and form a large compact cylindrical bale. Variations of the type machines utilizing this principle are illustrated in U.S. Pat. No. 3,859,909 to Mast, dated Jan. 14, 1975 and U.S. Pat. No. 3,722,197 dated Mar. 27, 1973.

All of the above cited methods of forming compact rolls of crop material of varying sizes utilized in some form crop material binding means. The binding material commonly took the form of twine and the binding means, accordingly, became known as twine wrapping means or apparatus. The apparatus was used in a twine wrapping cycle that included the steps of feeding the twine, wrapping the completed roll or bale and severing the twine prior to ejecting the roll or bale from the machine. Automatic twine wrapping apparatus which serially undertook the aforementioned three steps without any operator involvement, hydraulically or electrically powered apparatus requiring manual activation, and completely manually operated twine wrapping apparatus have been used in the art on the varying machines employing the different methods of forming cylindrical rolls of crop material. Operators and manufacturers of the earliest roll forming machines, generally of the type described in the above-cited U.S. Pat. No. 2,336,491, quickly realized the advantages of employing automatic twine wrapping apparatus to bind the completed crop roll or bale and to ensure that it maintained its cylindrical form after ejection from the bale forming machine. Twine wrapping apparatus of the type shown and described in U.S. Pat. No. 2,468,641, dated Apr. 26, 1949, employed automatic twine wrapping apparatus to wrap the completed cylindrical bale with binding material without having the operator leave his towing vehicle or manually power the twine wrapping apparatus.

The current increasing popularity of large crop roll forming machines has seen their use broaden from merely rolling wintering forage for livestock to rolling high protein crops. Therefore, these machines have been the focal point of many ideas for developing an automatic twine wrapping apparatus that could be utilized on the different bale forming machines that produce large, cylindrical compact bales varying in weight from 850 to 1500 pounds or more. The twine apparatus employed in the earlier roll forming machines was not satisfactory for adaptation to these new, larger machines.

Previous crop roll forming machines that produced the large cylindrical crop rolls employed either manually powered twine wrapping apparatus or manually controlled twine wrapping apparatus. Because these larger bale forming machines must be pulled by tractors frequently requiring substantial horsepower and size, the seats for the operators of these tractors were standardly enclosed within a cab or were sufficiently remote from the bale forming machine so that it was difficult, at best, for the operator to utilize manually powered twine wrapping apparatus. Even twine wrapping apparatus that was merely manually controlled required the operator to look back over his shoulder and observe the twine wrapping cycle taking place in the bale forming machine. Regardless of the type of twine wrapping apparatus employed, the requirement for the tractor operator to look over his shoulder caused the operator to be excessively fatigued at the end of a typical day of 8 or 10 hours of operating a roll forming machine.

Additionally, the older type bale forming machines that produced the comparatively small cylindrical bale and utilized automatic twine wrapping apparatus suffered from the disadvantage of not being able to adjust the timing of the activation of the twine wrapping apparatus so as to be able to form bales of varying desired size. With the advent of large bale forming machines in the agricultural industry it has become necessary to eject a less than full size bale from the bale forming machine either because of the exhaustion of the supply of windrowed crop material in a field or because of the occasional mechanical malfunctioning of the bale forming machine. Additionally, the automatic twine wrapping apparatus employed on the older type bale forming machines were activated through relatively complex linkage and clutch arrangements.

The foregoing problems are solved in the design of the apparatus comprising the present invention by permitting the automatic twine wrapping apparatus to be actuated by either one of two mechanisms when a desired bale size is obtained.

SUMMARY OF THE INVENTION

It is a principal object of the present invention to provide an improved automatic twine wrapping apparatus for a crop roll forming machine that will be actuated by either one of two mechanisms that will allow the twine wrapping cycle to be automatically or manually initiated and then run to its completion.

It is a feature of the present invention to provide an improved automatic twine wrapping apparatus that will permit the operator to preselect the desired diameter of the cylindrical crop roll to be formed by the baling machine.

It is another feature of the instant invention to provide an improved automatic twine wrapping apparatus that will permit the operator to initiate the wrapping cycle at anytime during the bale formation process.

It is an advantage of this invention to provide an improved automatic twine wrapping mechanism that will substantially reduce the operator fatigue experienced by a person operating a bale forming machine by permitting the twine wrapping cycle to be initiated manually or automatically and requiring, accordingly, little or no operator participation.

It is a further object of the present invention to provide an improved automatic twine wrapping apparatus that will automatically signal to the operator when a completed crop roll is being wrapped in the crop roll forming machine.

It is a further advantage of this invention to provide an improved automatic twine wrapping apparatus that employs a simplified linkage and clutching system to automatically wrap a completed roll of crop material with binding material and to automatically cut the material at the end of the wrapping cycle with the apparatus reset for further activation.

It is another feature of the instant invention to provide an improved automatic twine wrapping apparatus that is capable of being adjusted to vary the amount of binding material wrapped about the completed crop roll's periphery in response to the different roll form retention characteristics of different crops.

These and other objects, features and advantages are obtained by providing an improved automatic twine wrapping apparatus in a crop roll forming machine for binding a completed crop roll with binding material. The improved automatic twine wrapping apparatus is triggered by one of either two devices to automatically effect the serial steps of the twine wrapping cycle.

BRIEF DESCRIPTION OF THE DRAWINGS

The advantages of this invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
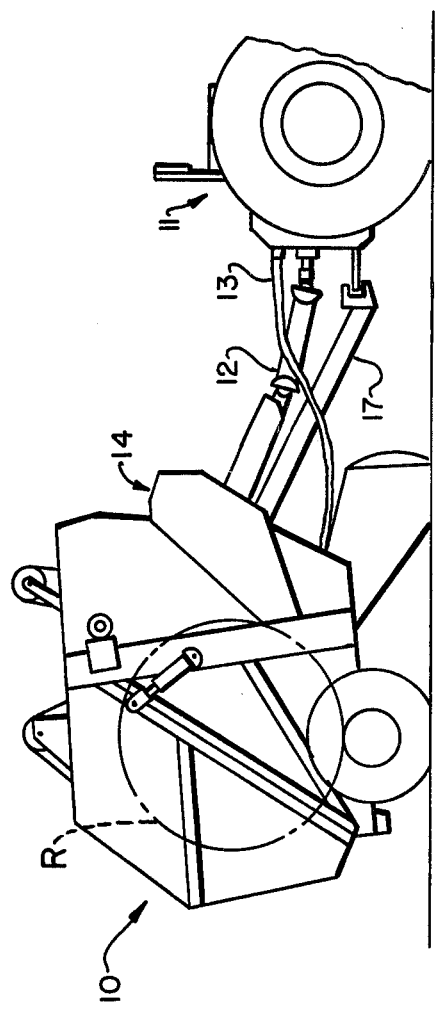
FIG. 1 is a side perspective view of the instant invention in its operational environment.

Referring generally to the drawings and in particular briefly to FIG. 1 there is depicted a general representation of a crop roll forming machine 10 of the type generally illustrated in U.S. Pat. No. 3,859,909 to Mast, dated Jan. 14, 1975. The crop roll forming machine 10 is in turn attached to a towing vehicle such as a tractor 11 with a power take-off 12 providing the driving force for the operational components of the crop roll forming machine. The tractor hydraulic lines 13 provide power for the hydraulically operated components of the crop roll forming machine 10. The automatic twine wrapping apparatus is generally indicated by the numeral 14 and is mounted to the side frame of the crop roll forming machine 10.

Figure 2:
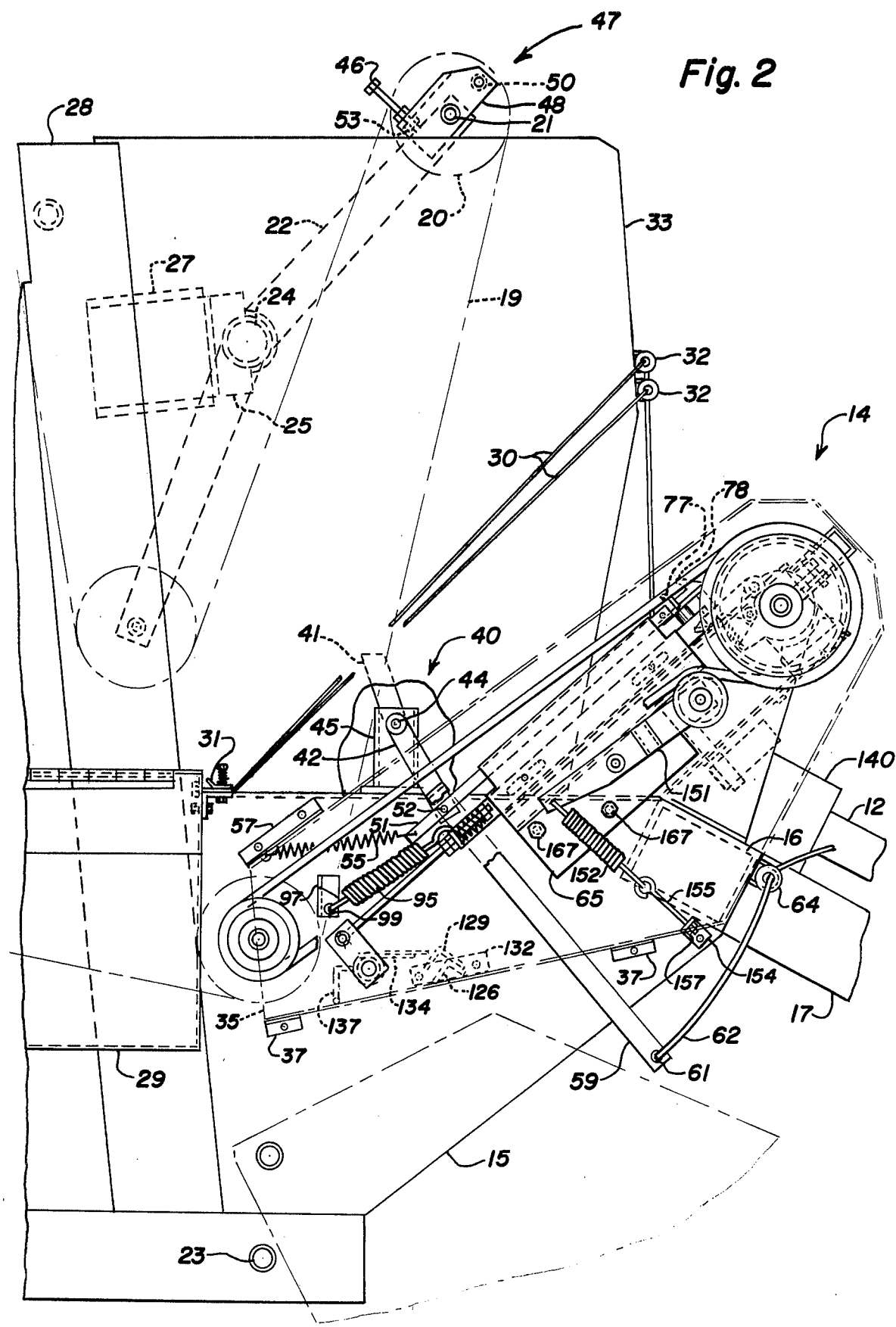
FIG. 2 is a side view of the front portion of a roll forming machine showing the automatic twine wrapping apparatus with the automatic and manual trip mechanisms.

FIG. 2 shows in detail all of the operational components of the automatic twine wrapping apparatus 14 which is mounted to side frame member 15 within casing member 35. Casing member 35 is secured by brackets 37 in a suitable manner, such as with bolts, to side frame member 15. The side frame member is adjacent a transverse support beam 16 and generally on a level with the baler tongue 17, used to fasten the roll forming machine 10 to the tractor 11. The lower bale forming means is shown generally by the numeral 18, see briefly FIG. 3, and is rotatably driven in an endless path about lower apron shaft 23. The upper bale forming means 19 is shown moving about idler sprockets 20 which are fastened by shafts 21 to pivotable support arms 22 that comprise the upper bale forming means takeup device. Support arms 22 are mounted on shaft 24 to bearing brackets 25, which are in turn mounted to the transverse support member 27 that extends the width of the bale forming machine. The transverse support member 27 is fastened between upright frame members 28 at each side of the roll forming machine. One of the upright frame members 28 has attached to it a crop roll binding material storage and dispensing box 29 from which the binding material 30, such as twine or sisal, is dispensed through tensioning means 31. The binding material 30 is guided through a pair of guide eyelets 32 mounted on the side shield 33 and routed to the twine dispensing tubes 34, seen in FIG. 3, of the wrapping apparatus 14.

TRIGGERING MEANS

Figure 10:
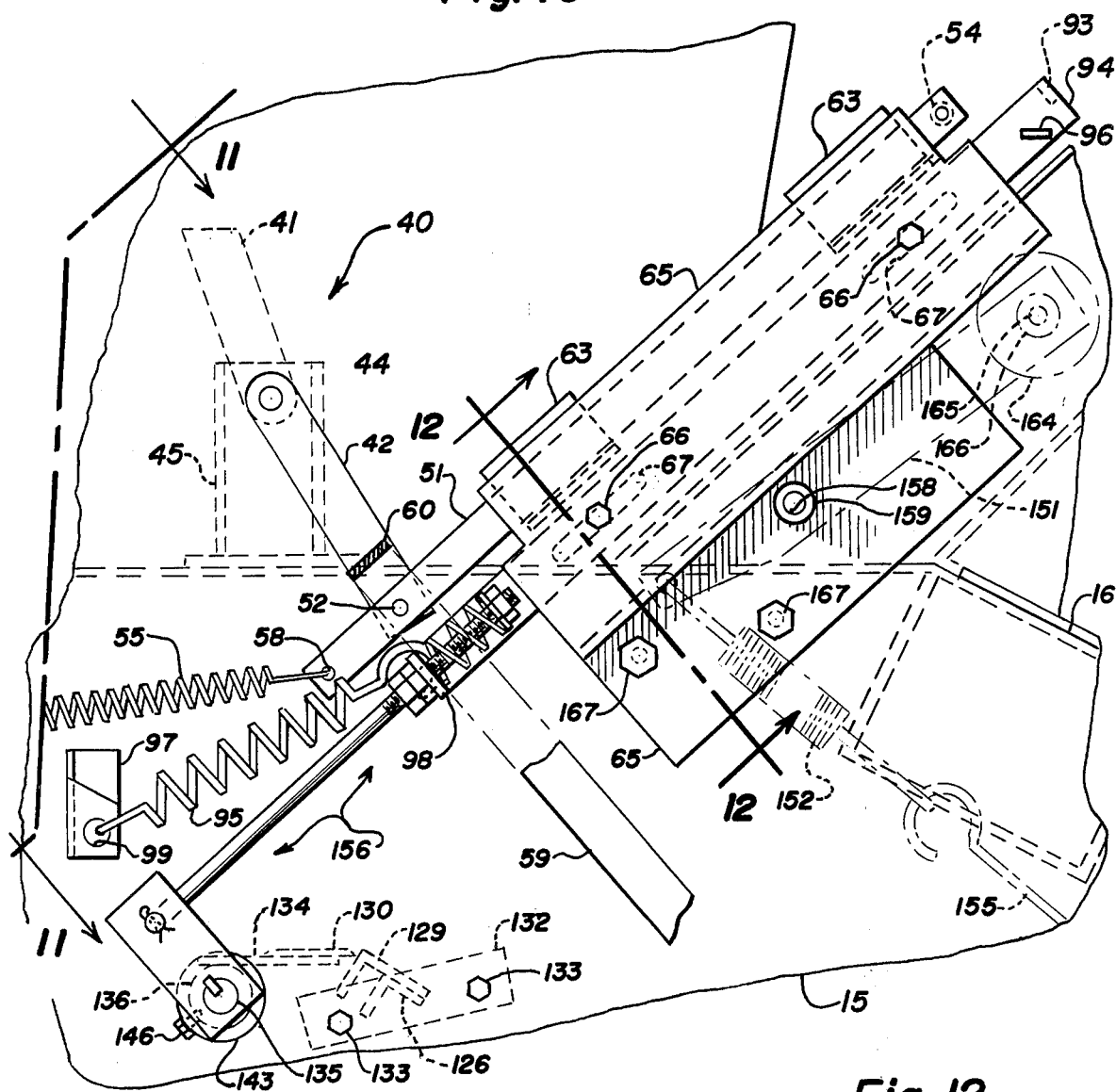
FIG. 10 is an enlarged fragmentary side elevation of FIG. 2.

The triggering means, indicated generally by the numeral 40, for the automatic twine wrapping apparatus is shown in its entirety in FIG. 2 and partially in enlarged scale in FIG. 10. Triggering means 40 comprises a pair of latch arms, 41 and 42 respectively, which are mounted about journal 44 to side frame bracket 45. The side frame bracket 45 is in turn mounted to side frame member 15 by a suitable method such as welding or bolting. The latch arms 41 and 42 are mounted about journal 44 in such a manner that the rotation of either arm causes the other to move in a correspondingly opposite direction.

The latch arms are selectively actuatable by either one of two trip mechanisms. Automatic trip mechanism 47, as shown in FIG. 2, comprises a pivotable side plate 48 mounted about shaft 21 to support arm 22. Side plate 48 has a transversely extending projection that is in the form of a roller 50 which engages latch arm 41 as the upper bale forming means 19 is fed out by the rotation of the support arms 22 in a clockwise direction about support arm shaft 24. The engagement of latch arm 41 by roller 50 moves latch arm 41 rearwardly and causes the opposing latch arm 42 to be rotated forwardly. Latch arm 42 is rotatably fastened to roller arm 51 by stub shaft and bushing 52 in a suitable fashion.

Figure 5:
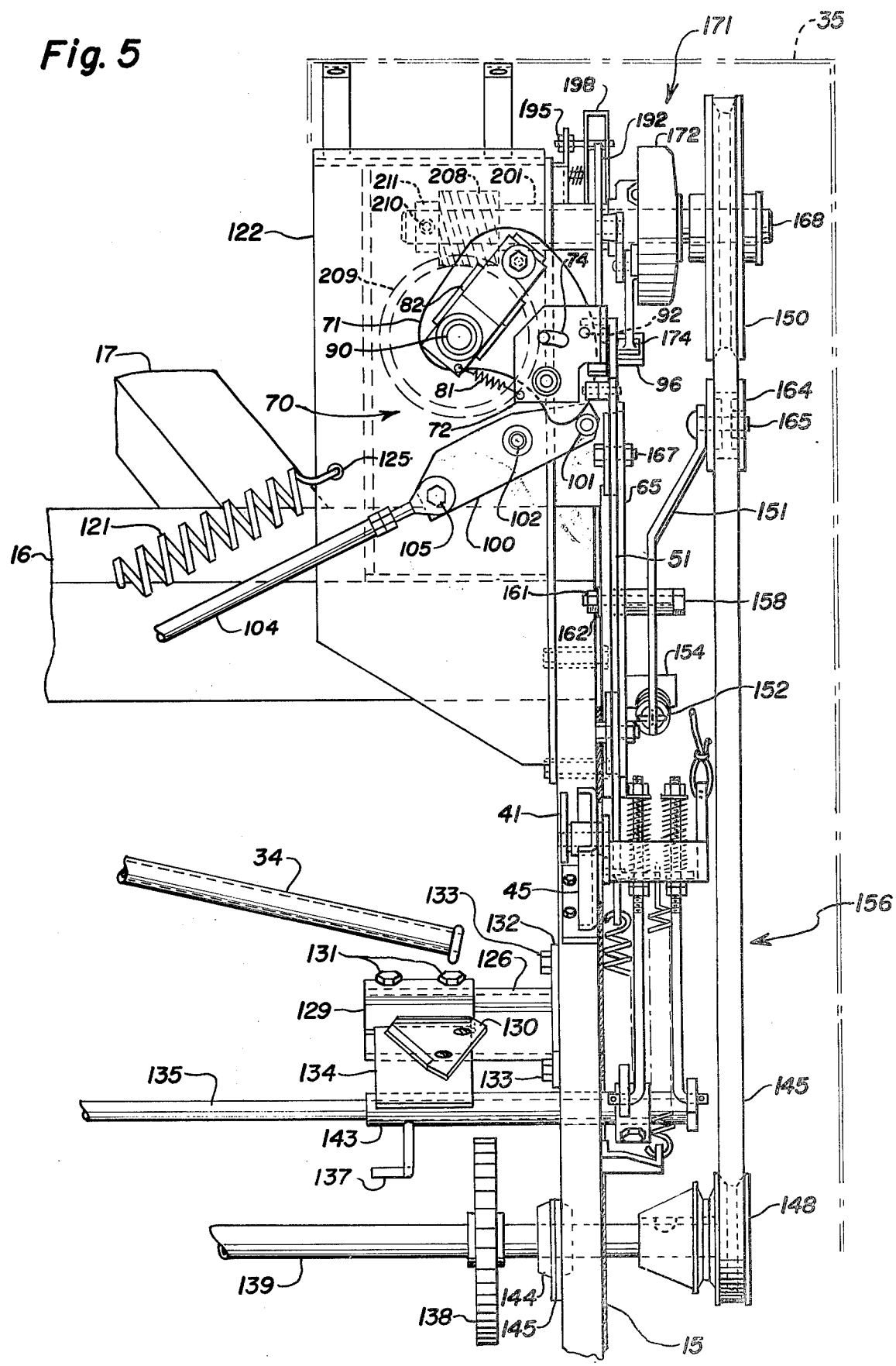
FIG. 5 is an enlarged scale fragmentary top plan view of FIG. 2.
Figure 6:
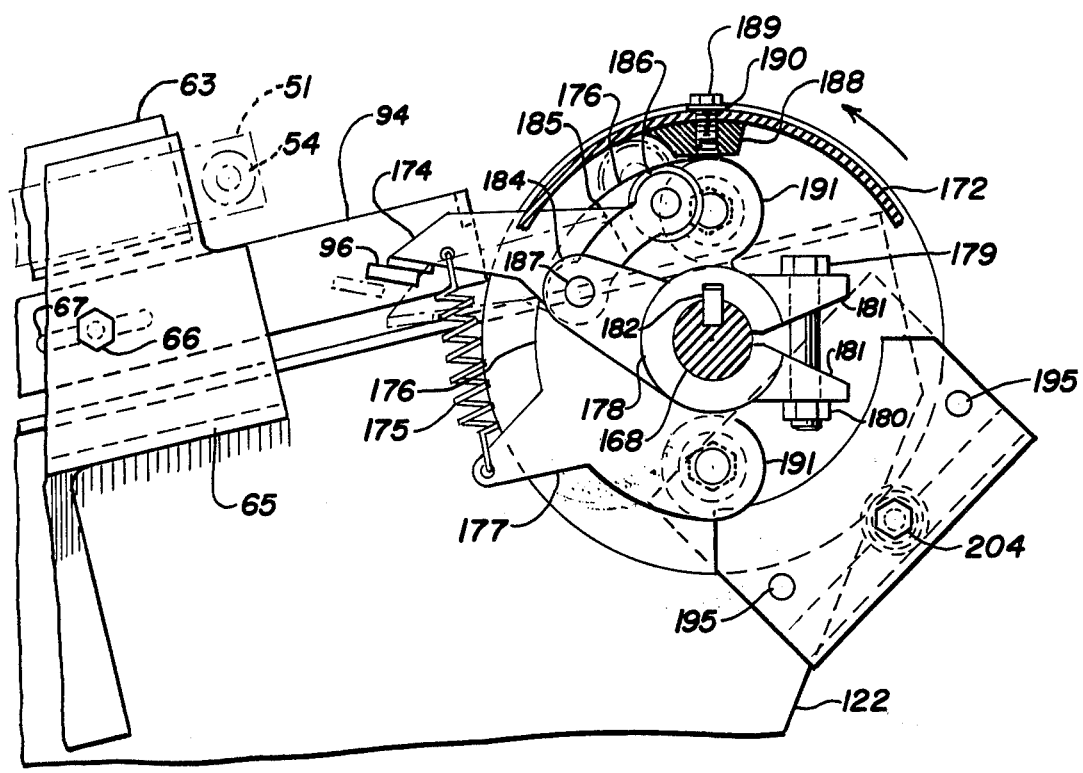
FIG. 6 is a side elevation taken along line 6—6 of FIG. 4.
Figure 7:
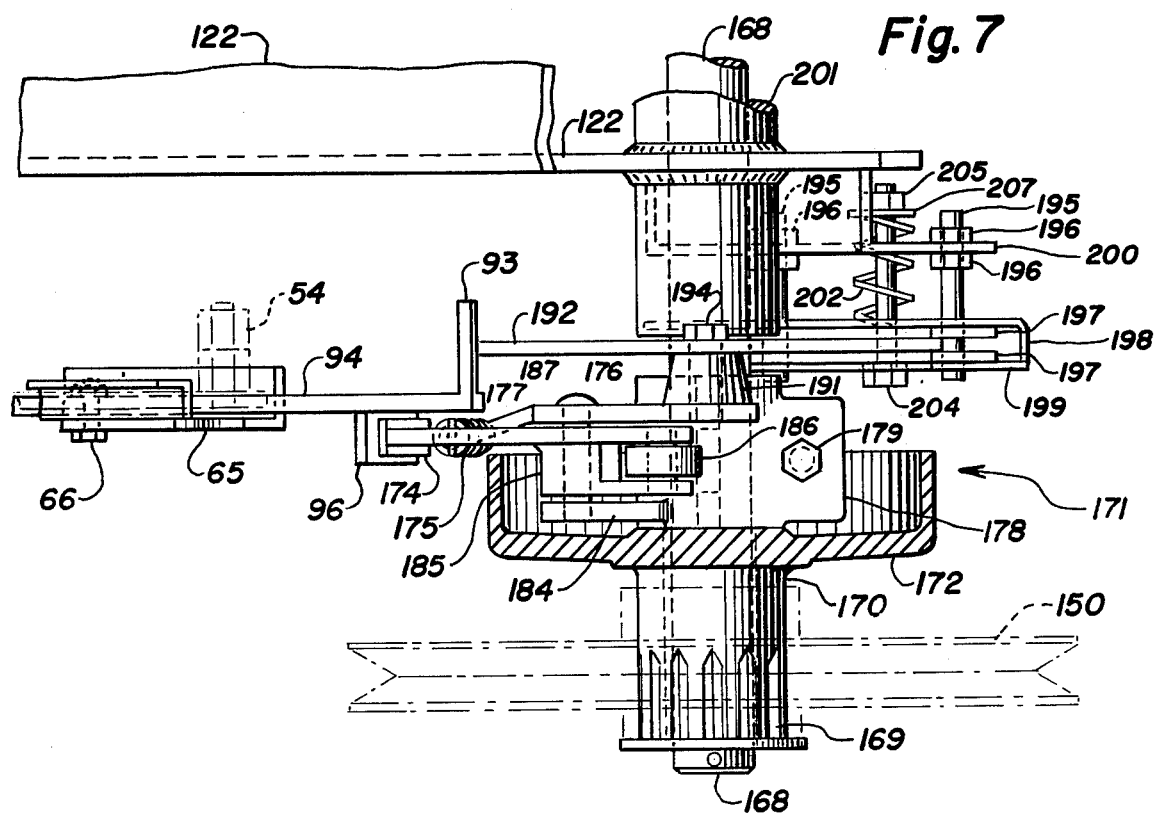
FIG. 7 is a top plan view of FIG. 6 having selected masking superstructure removed.
Figure 8:
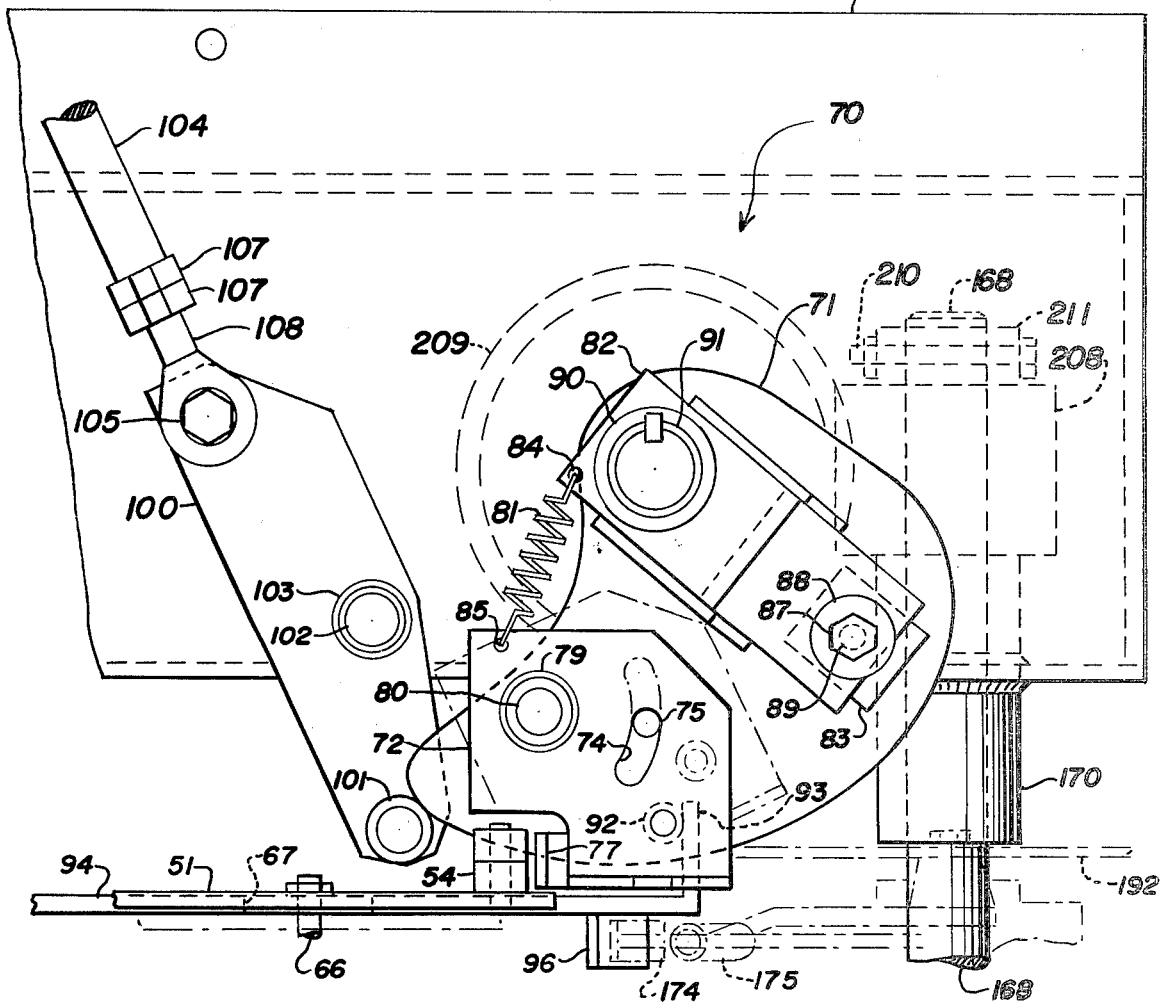
FIG. 8 is an enlarged fragmentary top plan view of the control means of the automatic twine wrapping apparatus.
Figure 9:
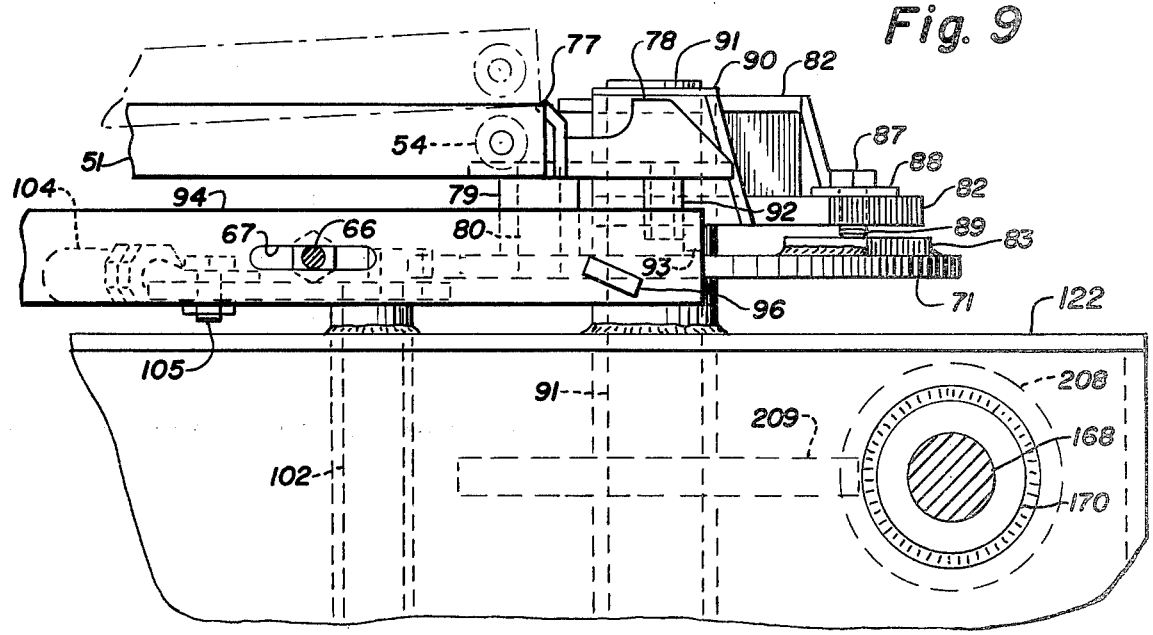
FIG. 9 is a fragmentary side elevation view corresponding to FIG. 8.

This resultant movement of latch arm 42 generally forwardly causes the roller arm 51 to slide forwardly and upwardly towards the control means indicated generally by the numeral 70, best shown in FIGS. 5, 8 and 9. Roller arm 51 has a roller bearing 54 at its forwardmost tip, best shown in FIG. 10. The roller arm 51 is also biased generally rearwardly and downwardly by the spring 55, or in another appropriate fashion. Biasing spring 55 is fastened at its rearmost portion into bracket 57, briefly see FIG. 2, and to roller arm 51 at its forwardmost end through a suitable aperture 58 in the arm.

Pivotable side plate 48 is movable through the use of an adjustment means, such as cap screw 46 fastened to the top of the side plate 48 by nuts 53, as seen in FIG. 2. Turning cap screw 46 in the appropriate direction will cause side plate 48 to be pivoted in a clockwise direction about the appropriate one of the shafts 21. Such adjustments will vary the time at which roller bearing 50 will activate the triggering means by shortening or lengthening the distance that must be travelled before the latch arm 41 is engaged.

Roller arm 51 is mounted in brackets 63, best shown in FIG. 10, that are welded to angled brace plate 65. Plate 65 is bolted to side frame member 15 by bolts 167 and lock nut 166. Stop arm 94 is movably suspended from plate 65 by bolts 66 extended through slots 67 of plate 65 and appropriate apertures in arm 94. Washers 68 and locking nuts 69 secure stop arm 94 to bolt 66.

The second of the two trip mechanisms for the triggering means 40 comprises a manually activated lever 59 welded or fixedly fastened in some other suitable manner to latch arm 42 at 60, as shown in FIG. 10. The lower portion of manual trip lever 59 may be equipped with an aperture 61 suitable for fastening a rope 62 or some other suitable tensioning means thereto and being guided through eyelet 64 to the operator's position on the towing vehicle.

CONTROL MEANS

The various apparatus of the triggering means 40 cooperate and interact with the control means, illustrated generally by the numeral 70 in FIGS. 3, 4, 5, 8 and 9. As best seen in FIGS. 5 and 8, the roller arm 51 is movably positioned adjacent a curvilinear cam plate 71 and a trigger cam plate 72. The trigger cam plate 72 has an arcuate slot 74 through which protrudes a cylindrical projection 75 which acts as a guide when the roller arm 51 is forced forwardly against the side bracket 77, see briefly FIGS. 2 and 9, with its retaining lip 78, thereby causing the trigger cam plate 72 to pivot in a counterclockwise direction about bearing sleeve 79 and shaft 80. The trigger cam plate 72 is biased against this counterclockwise rotation by cam spring 81 which is fastened to cam bracket assembly 82 and trigger cam plate 72 at 84 and 85 respectively. Cam bracket assembly 82 is secured to cam plate 71 in a suitable fashion, such as with lock nut 87, washer 88 and retaining bolt 89. Cam plate 71 is mounted about rotatable cam shaft 90 and bearing sleeve 91 and has a plate 83 welded to it for receiving bolt 89. The bearing sleeve 91 and the rotatable cam shaft 90 preferably are lubricatable, such as by means of a grease fitting. The trigger cam plate 72 has a lubricatable roller 92 protruding from its underside which engages the angle plate 93 of stop arm 94 when the twine wrapping apparatus 14 is not activated. The stop arm 94 is biased by a stop arm spring 95, as best shown in FIGS. 2 and 10, so that upon disengagement by the roller 92, caused by the counterclockwise pivoting of trigger cam plate 72, the stop arm 94 moves generally downwardly and rearwardly. Stop arm spring 95 is fastened to stop arm 94 and spring bracket 97 respectively at locations 98 and 99. Stop arm 94 has a stop arm plate 96 extending exteriorly from its forward end.

Cam plate 71 has a cam follower link 100 with a cam follower roller bearing 101 that follows the contour of the cam plate periphery as cam plate 71 is rotated about shaft 80. Cam follower link 100 is pivoted about a stub shaft 102 and bearing sleeve 103 as the cam follower roller bearing 101 is driven about the periphery of cam plate 71. Drag link 104 is secured to an end of cam follower link 100 by a retaining bolt 105 and appropriate washers and lock nuts (not shown). Drag link 104 is adjustable by means of nuts 107 fitted over threaded end portion 108.

Figure 3:
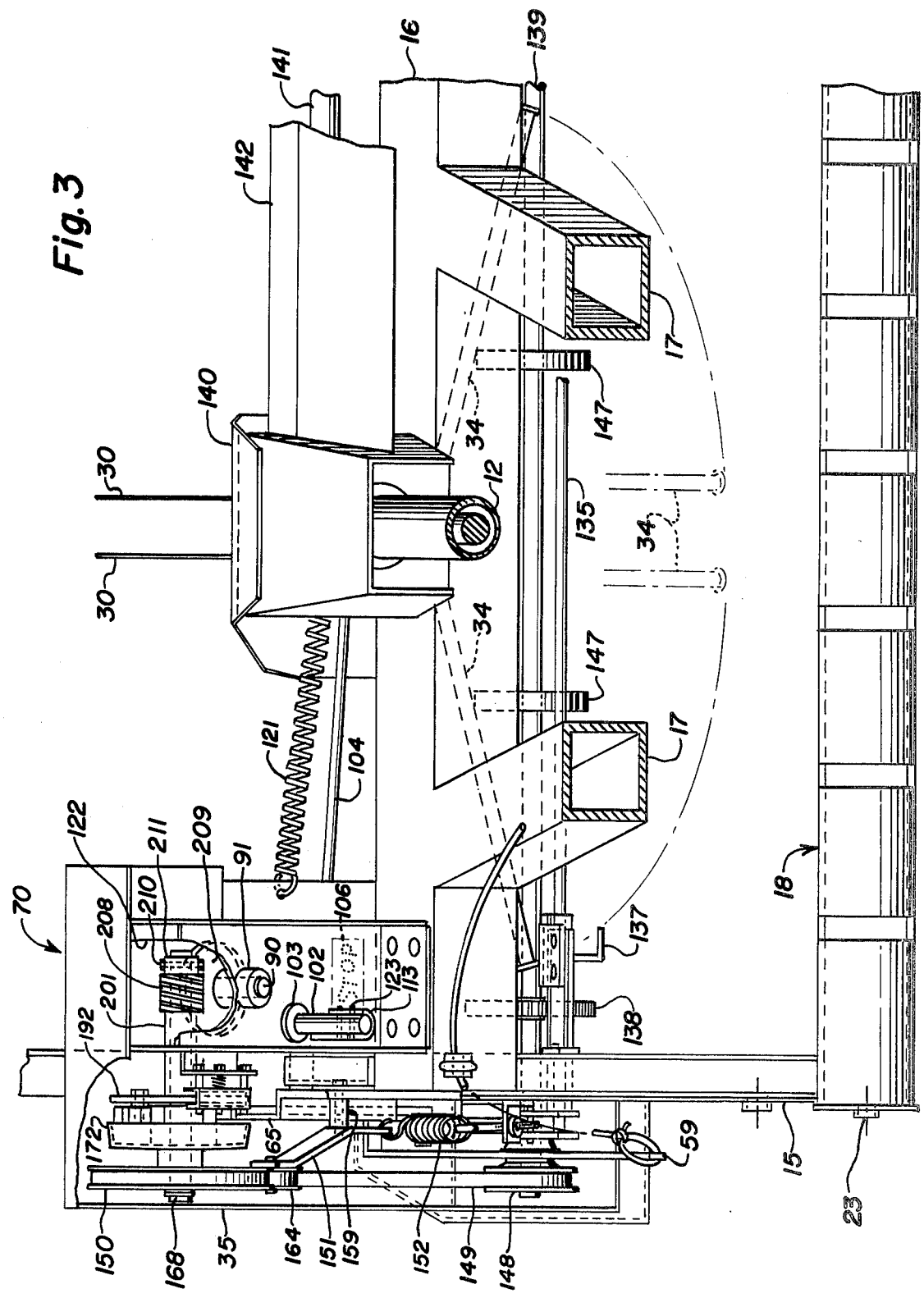
FIG. 3 is a front view of bale forming machine showing a portion of the twine wrapping apparatus and the twine dispensing means that span the bale forming region.

As best seen in FIG. 3, stub shaft 102 extends through the underside of housing plating 122 to provide the mounting for stop sign indicator 106. The stop sign indicator is rotated to its operator visible position when the cam follower roller bearing 101 has travelled from its home position through an arc of approximately 15 degrees along the periphery of curvilinear cam plate 72. The stop sign indicator 106 is mounted to stub shaft 102 by a bracket 113 fastened in a suitable fashion, such as by bolts 123, to stub shaft 102.

WRAPPING MEANS

Figure 4:
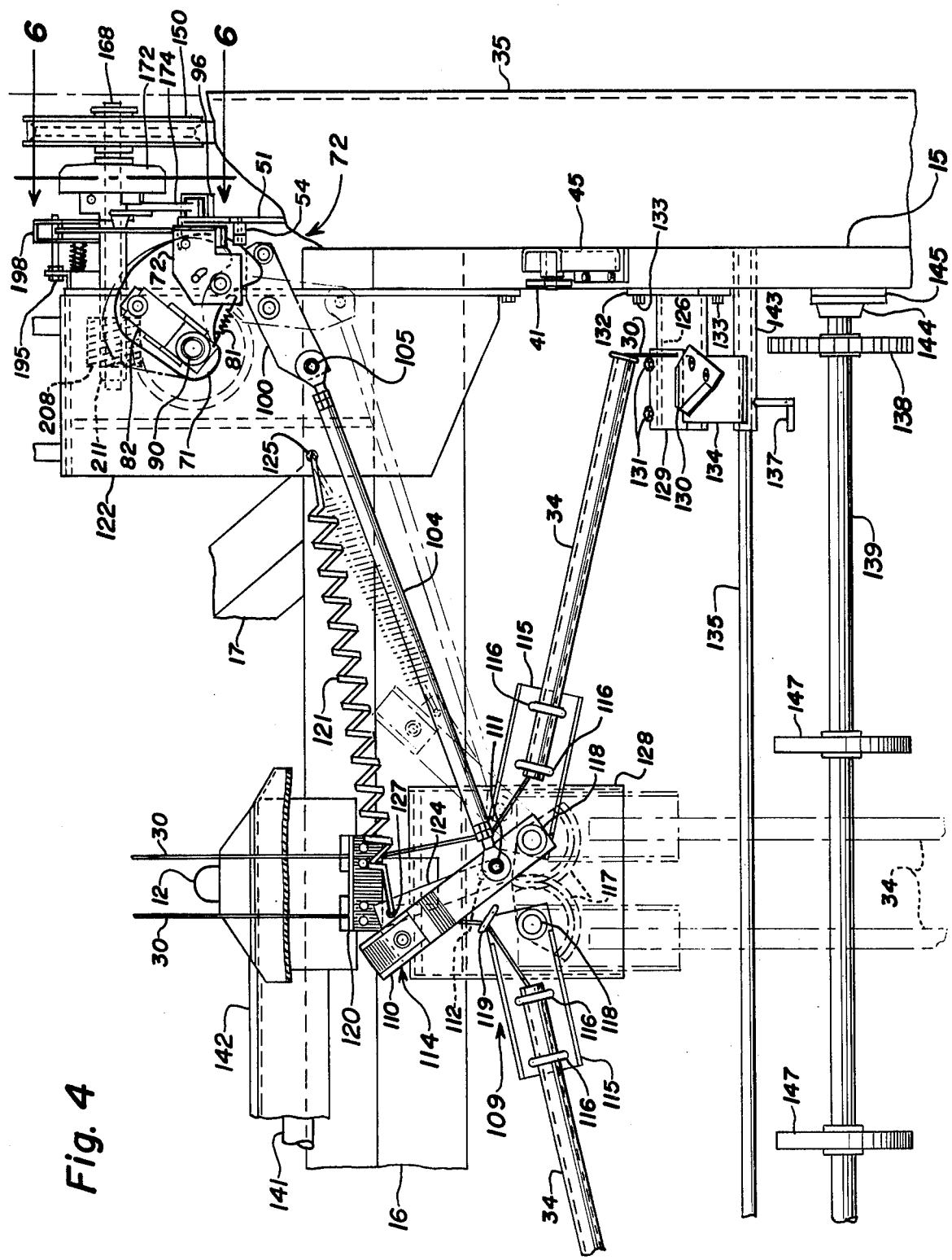
FIG. 4 is a top plan view showing the drive means, control means, and the drag arm used to drive the twine dispensing tubes in a roll forming machine.

Drag link 104 connects the control means 70 with the wrapping means indicated generally by the number 109 in FIG. 4. At its opposite end drag link 104 is rotatably fastened to driven link 110 by means of retaining bolt 111, lock washers and locking nuts (not shown), or other suitable rotatable fastening means. Driven link 110 is rotated about bolt 111. The wrapping means 109 utilizes a safety breakaway indicated generally by the numeral 114 to disengage the driven link 110 whenever the twine dispensing tubes 34 encounter an obstruction that exceeds a preselected limiting force value. The breakaway is not described in further detail at this time since it is old in the art and is described in detail in U.S. Pat. No. 4,072,095 to Campbell et al, assigned to the assignee of the present invention. Driven link 110 is connected to twine dispensing tube 34 by means of tube mounting plates 115 and intermeshing gears 117. The rotation of driven link 110 about bolt 111 allows the intermeshing gears 117 to be driven to cause journals 118 to rotate and thereby jointly force the dispensing tubes 34 downwardly in an arcuate path across the width of the bale forming region. The operation of this combination of links, dispensing tubes and gears is described in detail in concurrently filed copending application Ser. No. 894,458, entitled "Binding Material Apparatus" of Campbell et al, assigned to the assignee of the present invention. Twine tubes 34 are mounted to plates 115 by welded brackets 116. The binding material 30 is guided through the dispensing tubes 34 by guide means 119, only one of which is shown, and is retained under an appropriate amount of tension by tensioning means 120. The operation and structure of the tensioning means 120 is wholly conventional and well known in the art, and therefore is not described in more detail here.

The twine dispensing tubes 34 are biased by means of a spring 121 attached at its one end to housing plating 122 and rotatable biasing link 124. The spring 121 is fastened to its respective anchoring bodies through appropriate respective apertures 125 and 127. Biasing link 124 pivots about a collared stub shaft 112. Twine wrapping means 109 is mounted to the crop roll forming machine 10 by means of a mounting plate 128 fastened to transverse support beam 16 in a suitable fashion.

The binding material 30 is caused to be wrapped about the periphery of the completed crop roll R when the end of each strand is brought into frictional contact with the rotating crop roll as the twine dispensing tubes 34 are brought to their lowered position shown in FIG. 4. This frictional contact causes the binding material to be pulled from the twine dispensing tubes 34 as the tubes oscillate generally along the length of the completed crop roll R.

Twine severing means are provided, only one of which is shown, in FIGS. 4 and 10 which consists of a striker plate 129 and a rotatable severing means 130. The striker plate 129 is fastened by a suitable means, such as bolts 131, to a bracket 126, in turn affixed to support brace 132 fastened in an appropriate fashion, such as bolts 133 to side frame member 15. The rotatable severing means 130 is mounted in suitable fashion, such as by bolts or welding, to a rotatable base plate 134 which is fastened to rotatable rod 135 in a suitable fashion such as welding or the like. Rotatable rod 135 is keyed to a rotatable sleeve 136, best seen in FIG. 10, which in turn has a collar 143 fastened to it by set screw 146. Collar 143 has affixed at each side of the roll forming machine an L-shaped bracket 137 to prevent the binding material 30 from becoming entangled in the movable components of the bale forming means, such as drive sprocket 138 and rotatable drive shafts 139 best seen in FIG. 4.

Figure 11:
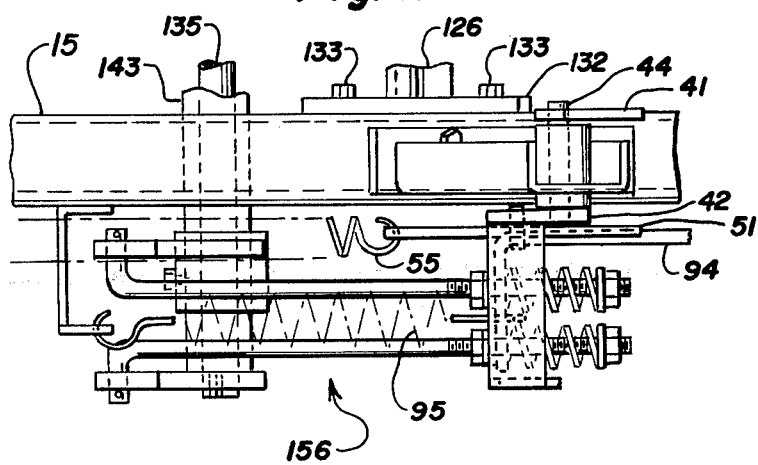
FIG. 11 is a fragmentary top plan view taken along the section line 11—11 of FIG. 10.
Figure 12:
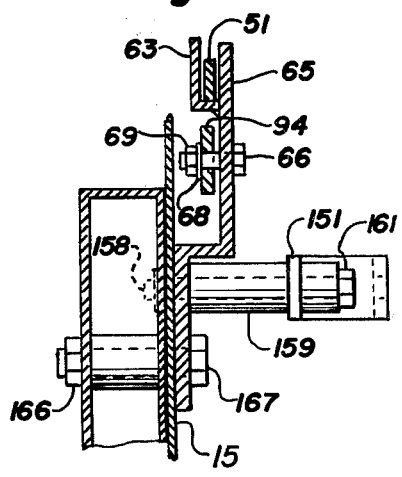
FIG. 12 is a sectional view taken along the section line 12—12 of FIG. 10.

As shown in detail in FIG. 11, the twine severing means is activated through a series of links and spring biased rods indicated generally by the numeral 156. The links are rotated about collar 143 by the action of stop arm 94 as it is pulled generally upwardly and forwardly by the lubricatable roller bearing 92 of the control means 70 as the twine wrapping cycle nears its completion. The details of the structure and operation of this series of links and spring biased rods are fully presented in the concurrently filed copending application Ser. No. 894,456, entitled "Independently Controlled Twine Knives" of J. S. Richardson, assigned to the assignee of the instant invention.

Alternatively the twine severing means could be activated by the action of the twine dispensing tubes 34 as they return to their home position, as shown and described in detail in U.S. Pat. No. 4,072,095 to Campbell et al, issued Feb. 7, 1978. This patent is specifically and entirely incorporated by reference herein, with the most significant portion being substantially shown in FIG. 4 thereof.

DRIVE MEANS

Power for the automatic twine wrapping apparatus 14 is supplied from the power take-off shaft 12 through a series of journalled shafts, belted sheaves and gears. FIG. 3 shows the power take-off shaft 12 leading into a 90 degree gearbox (not shown) enclosed in gearbox housing 140 and output shaft 141 which is encased in power output shaft jacket 142. Gearbox housing 140 is mounted on transverse support beam 16. The power is then transferred through a series of belted sheaves (not shown) to upper apron drive shaft 139 which is mounted in bearing jacket 144 and hub 145, best seen in FIG. 4. Shaft 139 also has spaced roller guides 147 mounted thereabout. As best shown in FIG. 5 upper apron drive shaft 139 exits from the opposite side of the bale forming machine through side frame member 15 and has journalled to its extremity sheave 148, which has two separate grooves for varying the speed of the twine wrapping apparatus. Sheave 148 is connected by a drive belt 149 to a clutch sheave 150. The belt 149 is properly tensioned by tensioning idler arm 151 which is biased by spring 152 fastened to side frame bracket 154 by an eye bolt 155 and retaining nut 157, best seen in FIG. 2. Belt tensioning idler arm 151 is pivotable about stub shaft 158 and bearing sleeve 159, as shown in FIG. 10. Tensioning idler arm 151 has a tensioning roller sheave 164 at its non-fastened end secured with a bolt 165 and a lock nut 166. The stub shaft 158 and bearing sleeve 159 are fastened through angled brace plate 65 by means of a locking nut 161 and washer 162, best shown in FIG. 5. As shown in FIGS. 2 and 10, angled brace plate 65 is fastened by bolts 167, or any other suitable fastening device, to side frame 15. Clutch sheave 150 is continuously driven by the upper apron drive shaft 139 while shaft 139 is driven and is mounted about sleeve 170 which is in turn fitted over driven shaft 168, as shown in FIGS. 3, 4, 5, 6 and 7. The sheave 150 is splined on its outermost edge as indicated by the numeral 169 in FIG. 7, thereby allowing the mounting of sheave 150 about sleeve 170. Sheave 150 could easily be interchanged for a multiply grooved clutch sheave, thereby permitting adjustment of drive belt 149 to be made between sheave 148 and 150 to preselect the desired speed at which the twine dispensing tubes 34 are driven across the periphery of the completed bale R of FIG. 1. Such a selection option permits the crop roll forming machine operator to vary the number of wraps of binding material that is placed about a completed bale according to the particular roll form retaining characteristics of the crops being baled.

Driven shaft 168 connects to a clutch mechanism 171 that will be described generally hereafter. The operation of the clutch mechanism 171, as well as its structure, is conventional. The clutch mechanism 171 is generally of the type explained in detail in U.S. Pat. No. 3,129,654, dated Apr. 21, 1964, hereby specifically incorporated by reference for a more detailed description of the structure and operation of the mechanism. Briefly, clutch 171 is fastened to the frame by means of housing plate 122 and includes, as been seen in FIGS. 6 and 7, a reinforced covering hub 172, a pawl 174 extending radially outwardly and biased by a spring 175 which causes the pawl 174 to pivot in a counterclockwise direction. Pawl 174 engages stop arm plate 96 when the clutch 171 is disengaged. Biasing sring 175 is fastened at the pawl opposing end to a pivotable retaining plate 177 which is merely a portion of the generally semicircularly casted extension 176 of unitary bushing 178 that fits about shaft 168. Bushing 178 is retained on shaft 168 by means of tightening bolt 179 and locking nut 180. Tightening bolt 179 passes through holes (not shown) in the bracket portion 181 of bushing 178. Bushing 178 is also keyed to shaft 168 by key 182. Bushing 178 also has a stub projection 184 casted to it with a hole (not shown) therein to allow the fastening of roller arm 185 by means of rivet 187 through stub projection 184 and a correspondingly aligned opening in the generally semicircularly casted extension 176 of FIG. 6. When the clutch 171 is engaged roller 186 of roller arm 185 is locked against roller catch 188 which is held to the top of pivoting hub 172 by means of a bolt 189 and washer 190, or another suitable means.

Bushing 178 also has two brake disc mountings 191 to which brake disc 192 is fastened by means of bolts 194, or other suitable mounting means. Brake disc 192 is further secured by mounting studs 195 and retaining nuts 196 which serve to hold brake pads 197 within brake pad brackets 198 and 199 to prevent the clutch from "drifting" or becoming prematurely engaged during field operation of the roll forming machine. Mounting studs 195 are secured on their interior side to bracket 200 which is fixedly fastened to housing plate 122 in a suitable fashion, such as welding. Interiorly of bushing 178 shaft 168 is encased in bushing 201 which is fixedly fastened to housing plate 122 by welding or in another suitable fashion. Pressure on the clutch brake disc is maintained by compression spring 202 circumferentially encompassing compressioning bolt 204 by means of adjustable lock nut 205 and a washer 207. The outwardly extending side of compression spring 202 is maintained in compression against bracket 198, which in turn compresses against the interior one of pads 197.

Shaft 168 extends inwardly toward the center line of crop roll forming machine 10, as shown in FIGS. 3, 4, 5 and 8, to connect with a worm 208, and a worm gear 209. As best shown in FIG. 3, worm 208 fits about bushing 201 about shaft 168 and is retained in position by means of collar 211 and retaining bolt 210, which passes through collar 211, bushing 201 and shaft 168. Worm gear 209 is fixedly fastened to rotatable cam shaft 90 so that power is transferred from shaft 168 through worm gear 209 to rotatable cam shaft 90 to thereby cause the rotation of cam plate 71.

In operation, the crop roll forming machine 10 is passed over and along a windrow or swath of precut crop material which is picked up from the field into the roll forming region of the crop roll forming machine. As the material is continuously fed to the roll forming machine 10 the cylindrically shaped bale R, as indicated in FIG. 1, is formed. Concomitantly the upper bale forming means 19 is fed out to engulf the periphery of the ever expanding bale R by the clockwise rotation of the pivotable support arms 22. When the automatic trip mechanism 47 has been pivoted sufficiently in a clockwise direction to have the roller 50 of pivotable side plate 48 engage the triggering latch arm 41 of triggering means 40, the automatic twine wrapping apparatus 14 is activated. Alternatively, the operator of the roll forming machine 10 could manually trigger the automatic twine wrapping apparatus 14 by pulling rope 62 fastened to manual trip lever 59. Either of the two trip means will cause roller arm 51 to be moved generally forwardly and upwardly to engage the retaining lip 78 of trigger cam plate 72 with the roller bearing 54 of roller arm 51. Pivotable trigger cam plate 72 is thereby pivoted about the shaft 80 causing the lubricatable roller bearing 92 to disenage from the stop arm angle plate 93, thereby permitting the stop arm 94 to move rearwardly in response to the spring biasing of stop arm spring 95. This rearward movement of stop arm 94 disengages the pawl 174 from the stop arm plate 96, permitting the bushing 178 to rotate with the splined sheave 150, sleeve 170 and hub 172 about driven shaft 168 when roller arm 185 is pivoted upwardly so that roller 186 engages the roller catch 188 permitting the power to be transferred through worm shaft 168, 208 and worm gear 209 to shaft 90.

The rotation of shaft 90 permits curvilinear cam plate 71 to commence a counterclockwise rotation causing cam follower roller bearing 101 to follow the peripheral surface of curvilinear cam plate 71. The tracking of curvilinear cam plate 71 by cam follower roller bearing 101 causes cam follower link 100 to pivot about stub shaft 102 and release twine dispensing tubes 34 from their home position to a generally fore-and-aft down position. Concurrently with the rotation of stub shaft 102 through approximately a 15 degree arc, stop sign indicator 106 is sprung to the visible position permitting the operator to see that the twine wrapping cycle has automatically begun. Cam follower link 100 drives drag link 104 through its predetermined path, which in turns drives driven link 110 of the twine wrapping means 109. The rotation of driven link 110 about journal 118 causes the intermeshing gears 117 to rotate journal 118 and the journals jointly cause the twine dispensing tubes 34 to be driven across the periphery of the formed crop roll R. Intermeshing gears 117 drive the twine tubes 34 back and forth across the periphery of the bale R as cam follower roller bearing 101 of cam follower link 100 follows the periphery of curvilinear cam plate 71. As the twine dispensing tubes 34 are returned upwardly to their home position curvilinear cam plate 71 is completing one full rotation and lubricatable roller bearing 92 reengages the stop arm angle plate 93 of stop arm 94, thereby raising that arm upwardly and forwardly. This upward and forward movement causes the rotatable rod 135 to be rotated forwardly to cause the rotatable severing means 130 to be rotated against the striker plate 129 and effectively sever the binding material or twine 30.

Upon severing of the twine from the two twine dispensing tubes the completed roll package R is ready for ejection from the crop roll forming machine 10 and the automatic twine wrapping apparatus 14 is reset and prepared to function upon activation by either of the two triggering means.

While the preferred structure in which the principles of the present invention have been incorporated is shown and described above, it is to be understood that the invention is not to be limited to the particular details thus presented but, in fact, widely different means may be employed in the practice of the broader aspects of this invention. The scope of the appended claims is intended to encompass all obvious changes in the details, materials and the arrangements of parts which will occur to one of skill in the art upon a reading of this disclosure.

Having thus described the invention, what is claimed is:

1. Apparatus for forming large cylindrical bales of crop material, which comprises:
    (a) a mobile frame having generally upwardly extending side supports;
    (b) a bale forming region within the side supports and the frame;
    (c) pickup means mounted to the frame to gather crop material from the ground and direct it towards the bale forming region;
    (d) bale forming means mounted on the frame having an upper bale forming means and a lower bale forming means, the upper bale forming means further having a pivotable support arm fastened to the frame;
    (e) wrapping means mounted to the frame for binding the bale of crop material with a binding material;
    (f) drive means mounted to the frame connected to the bale forming means and the wrapping means;
    (g) control means for the wrapping means so that once the wrapping means is activated the binding of the bale will automatically be carried to its completion and the wrapping means will be reset and prepared for activation to commence binding another bale;
    (h) triggering means mounted to the frame being selectively actuatable to activate the wrapping means when a desired bale size is obtained;
    (i) a first trip mechanism having a selectively extensible projection affixed to the pivotable support arm mounted to the frame on which is supported the upper bale forming means so that the support arm is rotated generally downwardly in an arcuate path as the bale is formed until the bale reaches a predetermined size which causes the extensible projection to engage the triggering means which automatically activates the wrapping means; and
    (j) a second trip mechanism having a manually activated lever connected to the triggering means which initiates the automatic operation of the wrapping means to bind bales of varying desired sizes upon activation.

2. The apparatus according to claim 1, wherein the extensible projection further comprises an adjustment means and a connected pivotable side plate such that varying the position of the adjustment means causes the side plate to be pivoted so that the triggering means can be variably engaged at different times during bale formation as the support arm is rotated in its arcuate path to thereby automatically activate the wrapping means to bind bales of varying predetermined desired sizes.

3. The apparatus according to claims 1 or 2, wherein the triggering means further comprises a pivotable latch, a releasable stop arm and a movable roller arm, both of the arms being attached to biasing means which tend to direct the stop arm and the roller arm generally toward the bale forming region when the stop arm and the roller arm are not subject to counteracting forces, the stop arm and the roller arm further connecting the triggering means with the control means and the wrapping means to automatically permit the transfer of power from the drive means through the control means to activate the wrapping means.

4. The apparatus according to claim 3, wherein the drive means connectable to the wrapping means comprises a rotatably driven shaft supported on the frame, a clutch for connecting the driven shaft to the control means, means for controlling the engagement of the clutch comprising a biased pivotable pawl radially extending from the clutch which strikes the stop arm when the clutch is disengaged, gear means for transferring rotary power from the driven shaft through a rotatable control shaft to the control means and the wrapping means, a bale size indicator that upon activation of the wrapping means transmits a visible signal that the baling apparatus should be halted until wrapping is completed, and a clutch tensioning means to keep the clutch disengaged until the wrapping means is activated.

5. The apparatus according to claim 4, wherein the control means comprises a curvilinear cam plate movable about the rotatable control shaft, a pivotable trigger plate that is activated by the roller arm to pivotably disengage from the stop arm thereby releasing the stop arm to respond to its spring biasing and permit the clutch to disengage, and a drive link with a roller cam follower that will drive the wrapping means generally horizontally across the bale forming region at a speed that is responsive to the curved surface of the cam plate.

6. The apparatus according to claim 5, wherein the wrapping means comprises twine dispensing means movable at a twine dispensing end to feed out twine generally horizontally across the bale forming region and cutting means automatically activated to sever the twine after the bale has been wrapped.

7. In a crop roll forming machine of the type having bale forming means movably mounted on a mobile frame, a bale forming region, a drive means, an automatic wrapping means to bind a formed roll with a binding material, triggering means, a first trip mechanism having a selectively extensible projection affixed to a pivotable support arm mounted to the frame on which is supported the bale forming means so that the support arm is rotated generally downwardly in an arcuate path as the bale is formed until the bale reaches a predetermined size which causes the extensible projection to engage, the triggering means which activates the wrapping means, and a second trip mechanism having a manually activated lever connected to the triggering means which initiates the automatic operation of the wrapping means to bind bales of varying desired sizes, and a control means for the automatic wrapping means, the improvement comprising:
    triggering means selectively actuatable by either one of the trip mechanisms to activate the wrapping means when a desired bale size is obtained, the triggering means further including a pivotable latch, a releasable stop arm and a movable roller arm, both of the arms being attached to biasing means which tend to direct the stop arm and the roller arm generally toward the bale forming region when the stop arm and the roller arm are not subject to counteracting forces, the stop arm and the roller arm further connecting the triggering means with the control means and the wrapping means to automatically permit the transfer of power from the drive means through the control means to activate the wrapping means.

8. The apparatus according to claim 7, wherein the extensible projection further comprises an adjustment means and a connected pivotable side plate such that varying the position of the adjustment means causes the side plate to be pivoted so that the triggering means can be variably engaged at different times during bale formation as the suppot arm is rotated in its arcuate path to thereby automatically activate the wrapping means to bind bales of varying predetermined desired sizes.

9. The apparatus according to claim 8, wherein the drive means connectable to the wrapping means comprises a rotatably driven shaft supported on the frame, a clutch for connecting the driven shaft to the control means, means for controlling the engagement of the clutch comprising a biased pivotable pawl radially extending from the clutch which strikes the stop arm when the clutch is disengaged, gear means for transferring rotary power from the driven shaft through a rotatable control shaft to the control means and the wrapping means, a bale size indicator that upon activation of the wrapping means transmits a visible signal that the crop roll forming machine should be halted until wrapping is completed, and a clutch tensioning means to keep the clutch disengaged until the wrapping means is activated.

10. The apparatus according to claim 9, wherein the control means comprises a curvilinear cam plate movable about the rotatable control shaft, a pivotable trigger plate that is activated by the roller arm to pivotably disengage from the stop arm thereby releasing the stop arm to respond to its spring biasing and permit the clutch to disengage, and a drive link with a roller cam follower that will drive the wrapping means generally horizontally across the bale forming region at a speed that is responsive to the curved surface of the cam plate.

11. The apparatus according to claim 10, wherein the wrapping means comprises twine dispensing means movable at a twine dispensing end to feed out twine generally horizontally across the bale forming region and cutting means automatically activated to sever the twine after the bale has been wrapped.

* * * * *